(12) United States Patent
Morton

(10) Patent No.: US 12,108,709 B2
(45) Date of Patent: Oct. 8, 2024

(54) TECHNOLOGY AND TECHNIQUE TO PREVENT, DIMINISH OR INTERFERE WITH THE FORMATION OF SEA AND LAND-BASED STORMS SUCH AS HURRICANES AND TORNADOS ON EARTH

(71) Applicant: S. Bruce Morton, Herndon, VA (US)

(72) Inventor: S. Bruce Morton, Herndon, VA (US)

( * ) Notice: Subject to any disclaimer, the term of this patent is extended or adjusted under 35 U.S.C. 154(b) by 0 days.

(21) Appl. No.: 18/488,642

(22) Filed: Oct. 17, 2023

(65) Prior Publication Data

US 2024/0040975 A1    Feb. 8, 2024

Related U.S. Application Data

(63) Continuation of application No. 18/063,164, filed on Dec. 8, 2022, now Pat. No. 11,825,776, and a
(Continued)

(51) Int. Cl.
| | |
|---|---|
| *A01G 15/00* | (2006.01) |
| *B64G 1/10* | (2006.01) |
| *B64G 1/42* | (2006.01) |
| *G01W 1/02* | (2006.01) |
| *H02J 50/20* | (2016.01) |
| *H02J 50/30* | (2016.01) |
| *H02J 50/50* | (2016.01) |
| *H02S 10/40* | (2014.01) |

(52) U.S. Cl.
CPC ........... *A01G 15/00* (2013.01); *B64G 1/1021* (2013.01); *B64G 1/428* (2013.01); *G01W 1/02* (2013.01); *H02J 50/20* (2016.02); *H02J 50/30* (2016.02); *H02J 50/50* (2016.02); *H02S 10/40* (2014.12); *B64G 1/1042* (2023.08)

(58) Field of Classification Search
CPC .......... A01G 15/00; H02S 10/40; H02J 50/20; H02J 50/30; H02J 50/50; B64G 1/1021; B64G 1/428; B64G 1/1042; G01W 1/02
See application file for complete search history.

(56) References Cited

U.S. PATENT DOCUMENTS

| | | |
|---|---|---|
| 3,781,647 A | 12/1973 | Glaser |
| 4,368,415 A | 1/1983 | Henderson et al. |
| 2006/0201547 A1 | 9/2006 | Rogers et al. |

FOREIGN PATENT DOCUMENTS

JP    2008092845 A    4/2008

OTHER PUBLICATIONS

Stephen A. Nelson, "Tropical Cyclones (Hurricanes)," <tulane.edu/~sanelson/New_Orleans_and_Hurricanes/tropical_cyclones.htm>, retrieved Aug. 22, 2018, 17 pages.
(Continued)

*Primary Examiner* — Carlos Amaya
(74) *Attorney, Agent, or Firm* — Jordan IP Law, LLC

(57) ABSTRACT

Systems, apparatuses, and methods provide for technology that locates one or more masses of an ocean-based weather system, as the ocean-based weather system starts to organize and before the ocean-based weather system spawns a land-based storm, and controls a transmission of electromagnetic radiation from the space platform to the one or more masses, wherein the transmitted electromagnetic radiation tracks the one or more masses as the ocean-based weather system is starting to organize and rotate, and wherein the transmitted electromagnetic radiation prevents the ocean-based weather system from rotating and spawning the land-based storm.

19 Claims, 5 Drawing Sheets

Related U.S. Application Data continuation of application No. 16/416,463, filed on May 20, 2019, now Pat. No. 11,564,361.

(60) Provisional application No. 62/721,820, filed on Aug. 23, 2018.

(56) References Cited

OTHER PUBLICATIONS

Imgkid, "Tropical Cyclones Diagram," <imgkid.com/tropical-cyclones-diagram.shtml>, retrieved Aug. 22, 2018, 14 pages.

International Search Report and Written Opinion for International Patent Application No. PCT/US2019/036052, mailed on Oct. 18, 2019, 9 pages.

Non-Final Office Action for U.S. Appl. No. 16/416,463, mailed on Apr. 18, 2022, 26 pages.

Notice of Allowance for U.S. Appl. No. 16/416,463, mailed Sep. 9, 2022, 7 pages.

Notice of Allowance for U.S. Appl. No. 18/063,164, mailed Jul. 20, 2023, 9 pages.

THE MAKING OF A STORM

TECHNOLOGY AND TECHNIQUE TO PREVENT, DIMINISH OR INTERFERE WITH THE FORMATION OF SEA AND LAND-BASED STORMS SUCH AS HURRICANES AND TORNADOS ON EARTH

CROSS-REFERENCE TO RELATED APPLICATIONS

The present application is a continuation of and claims the benefit of priority to U.S. Non-Provisional patent application Ser. No. 18/063,164 filed on Dec. 8, 2022, which is a continuation of and claims the benefit of priority to U.S. Non-Provisional patent application Ser. No. 16/416,463 filed on May 20, 2019, now U.S. Pat. No. 11,564,361, which claims the benefit of priority to U.S. Provisional Patent Application No. 62/721,820 filed on Aug. 23, 2018.

TECHNICAL FIELD

Embodiments generally relate to weather pattern technology. More particularly, embodiments relate to technology and techniques to prevent, diminish or interfere with the formation of hurricanes on Earth from one or more platforms in space.

BACKGROUND

A hurricane is a type of storm called a tropical cyclone, which forms over tropical or subtropical waters. Hurricanes have historically caused significant damage, injury and loss of life.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
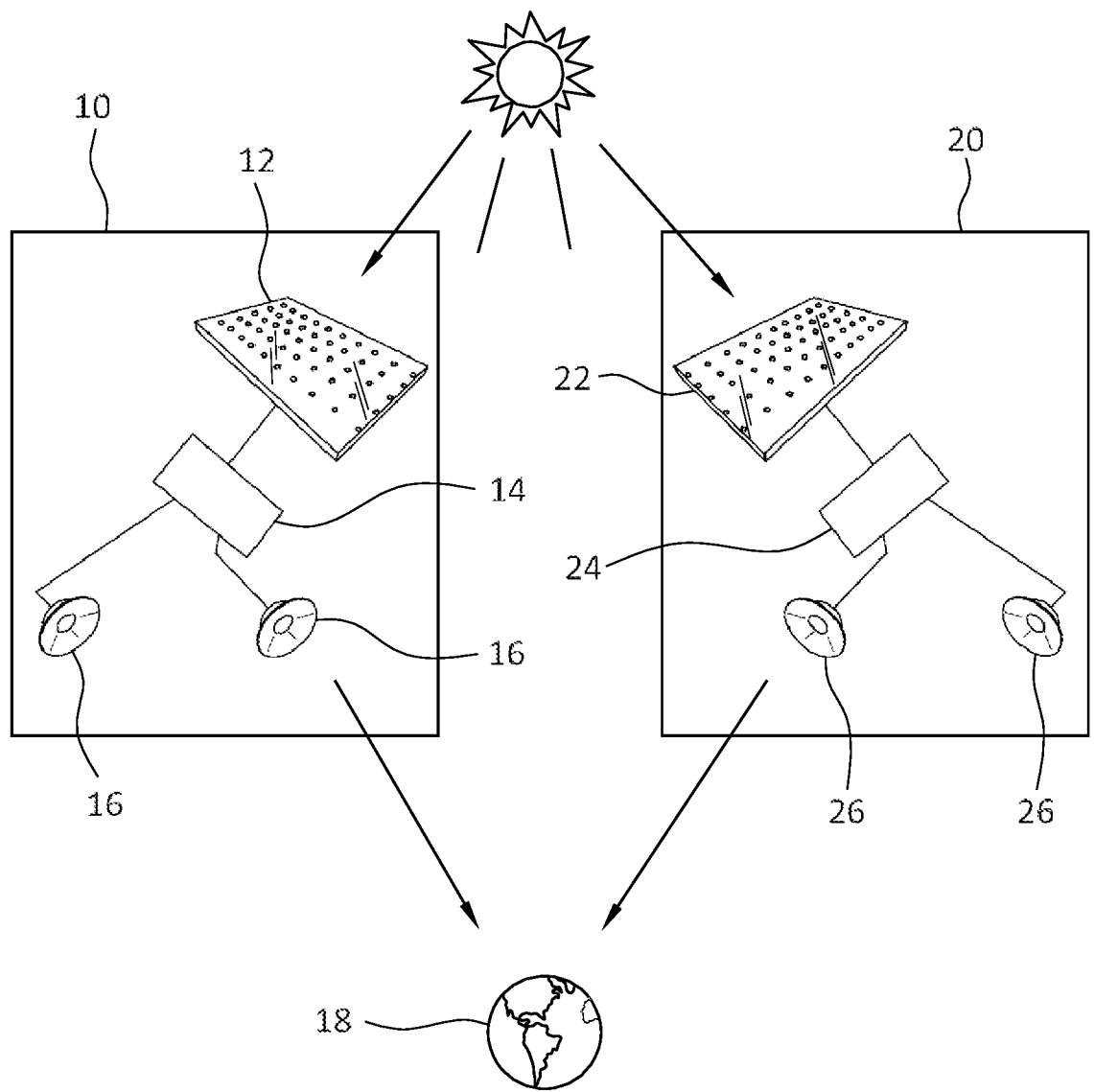
FIG. 1 is an illustration of an example of a plurality of space platforms according to an embodiment.

In certain latitudes (e.g., tropical and subtropical waters), low pressure areas attract winds, winds curve counterclockwise due to the Coriolis effect, and winds cause an above normal amount of ocean water to rise/evaporate. When conditions are "ideal" (e.g., relative humidity is high, upper winds are very cold, etc.), rising and evaporated water (with high relative humidity) hits very cold air and starts to rapidly condense and fall. When all of the above conditions coincide to constitute ideal conditions (including appropriate winds, correct relative humidity, ideal upper air temperatures, etc.) a tropical depression is created. Additionally, the tropical depression beginning to intensify is a precursor to a tropical storm and then a hurricane (alternatively called a cyclone or typhoon).

The technology and technique described herein interrupts this intensifying rotating cycle by focusing energy (e.g., microwave energy, millimeter wave energy, solar energy, laser energy or other type of energy) on one or more segments of the slowly rotating tropical depression. The transmitted energy interrupts and destabilizes those segments, and ultimately disrupts the entire tropical depression. Focusing microwave energy on one or more segments accomplishes this interruption/destabilization via one or more (and possibly all) of the following:

(a) heating and warming water vapor, thus interfering with and preventing the required ideal level of relative humidity from being achieved;

(b) heating and warming the colder air, thus interfering with and preventing the required ideal level of condensation;

(c) heating, warming, and expanding the colder air, thus interfering with its rotation and causing it to deviate from its increasingly cyclic path;

(d) causing a major instability in a roughly uniform spinning disk/mass by causing instabilities in one or more segments, causing the spinning disk/mass to lose its ability to sustain and reinforce a cycle of increasing intensity and rotation; and (e) generally interfering with the ideal conditions required to sustain and increase a tropical depression. Note that once the tropical depression is formed, one can assume that the existing conditions are close to ideal. Accordingly, interfering with the existing conditions will significantly interfere with the tropical depression's ability to sustain itself.

There are many instances in which a newly forming tropical depression cannot sustain ideal conditions, and eventually breaks up. The proposed technique is mainly applicable to those instances in which a tropical depression experiences sustained ideal conditions, begins to intensify, and appears to be likely to become to a tropical storm and then a hurricane. The technology interferes with the tropical depression, and successfully keeps it from intensifying to become a tropical storm or a hurricane. The energy required to successfully interfere with and destabilize a tropical depression is significantly less than the energy that would be required to successfully interfere with a tropical storm or a hurricane.

Turning now to FIG. 1, a first space platform 10 is shown in which one or more solar panel arrays 12 collect solar energy. The collected solar energy may be converted by a subsystem 14 (e.g., including a logic architecture, bus, etc.) into electromagnetic radiation that one or more transmitters 16 transmit to one or more segments of a rotational weather pattern (not shown) on Earth 18 or other planetary body in the solar system. In the illustrated example, the first space platform 10 coordinates transmission of the electromagnetic radiation with a second (e.g., additional) space platform 20. Thus, the second space platform 20 may also include one or more solar panel arrays 22 that collect solar energy, a subsystem 24 to convert the collected solar energy into electromagnetic radiation, and one or more transmitters 26 that transmit the electromagnetic radiation to one or more segments of the rotational weather pattern. The use of multiple platforms 10, 20 may reduce the amount of energy that needs to be collected and transmitted on each platform 10, 20. In this regard, the typical output from each platform 10, 20 might be on the order of thousands of megawatts (for reference, the 2012 net generation capability of Three Mile Island nuclear power plant was 829 MW). Moreover, the type of transmitted electromagnetic radiation (e.g., millimeter wave) may impact the efficiency of the effect/impact on water vapor and/or relative humidity. The platforms 10, 20 may also coordinate with one or more land-based systems (e.g., FAA—Federal Aviation Administration systems, and ICAO— International Civil Aviation Organization/ICAO systems) on Earth 18 to divert aircraft around the transmitted electromagnetic energy (e.g., via notices to airmen/NOTARs). The platforms 10, 20 may also coordinate with Air Force JSpOC (Joint Space Operations Center), which also coordinates with commercial spacecraft operators and other government operators including via Space-Track.org. Accordingly, orbiting spacecraft may either plan to avoid the energized area while in orbit (although the energized beam would be quite narrow vs. the wide vastness of orbital space), or the beam could be paused briefly if necessary to let a spacecraft pass through the projected beam area. The illustrated platforms 10, 20 therefore reduce the likelihood of damage, injury and/or loss of life associated with hurricanes.

Figure 2A:
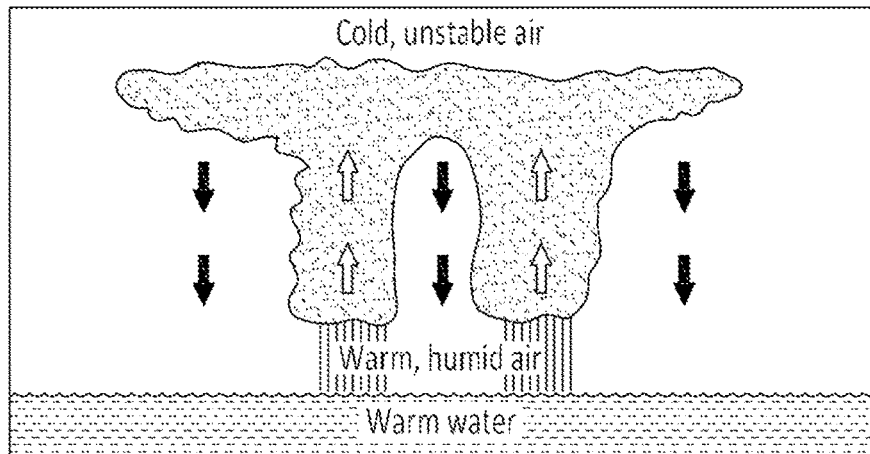
FIG. 2A is a simplified illustration of a rotational weather pattern according to an embodiment.
Figure 2B:
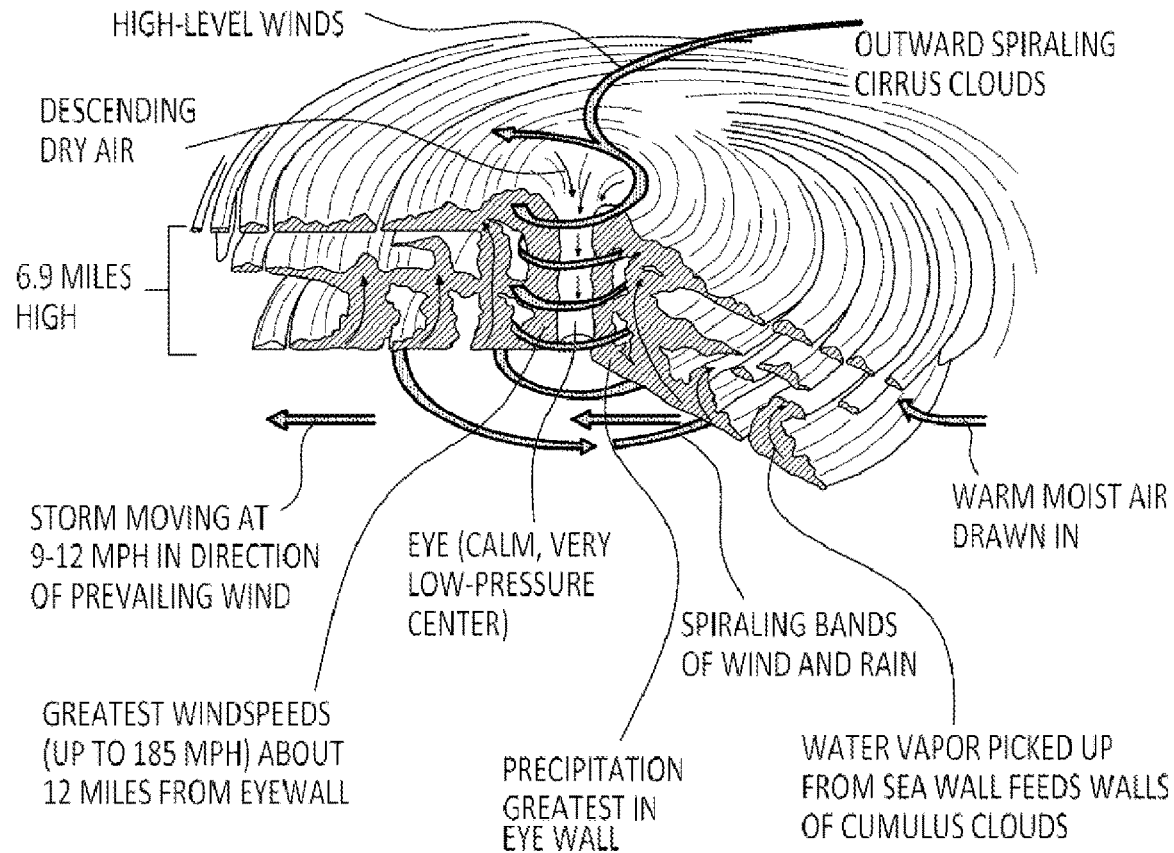
FIG. 2B is a more complex illustration of a rotational weather pattern according to an embodiment.
Figure 2C:
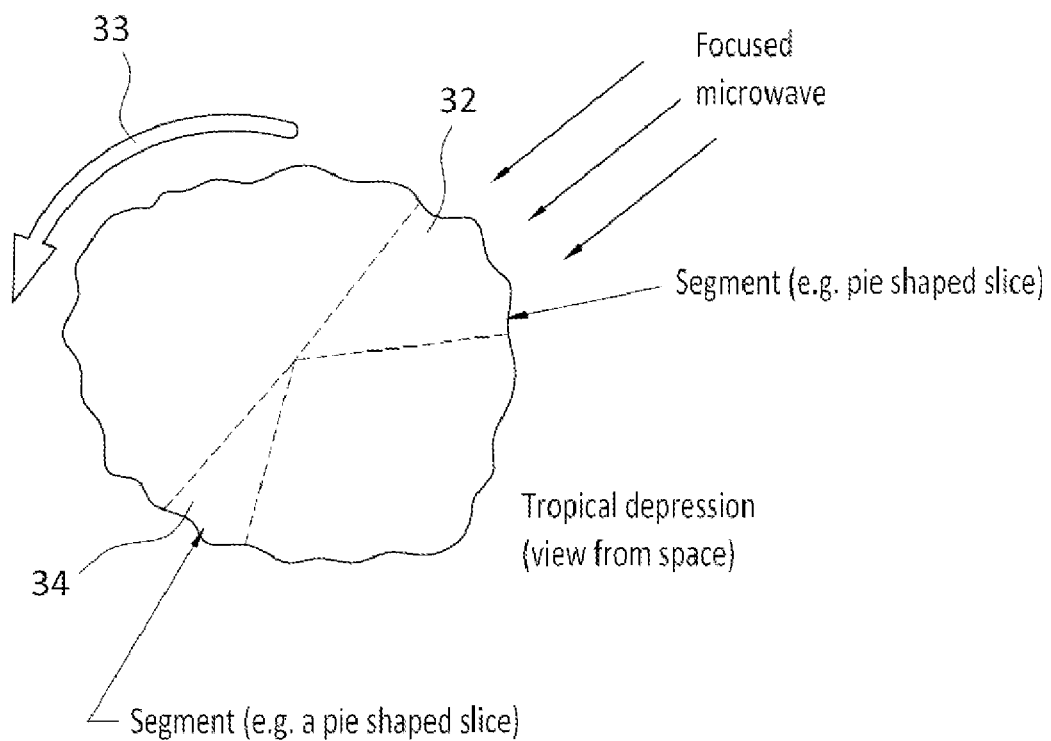
FIG. 2C is a plan view of an example of segments being identified in a rotational weather pattern according to an embodiment.

FIG. 2A is a simplified illustration of a rotational weather pattern 30 and FIG. 2B is a more complex illustration of a rotational weather pattern 31. FIG. 2C shows a plan view of a rotational weather pattern in which a first segment 32 and a second segment 34 are selected and/or identified. In the illustrated example, the transmitted electromagnetic radiation is focused on and tracks the segments 32, 34 in a generally circular motion 33 around the rotational weather pattern. In one example, wind speed data is used to determine the revolutions per minute (RPM) of the rotational weather pattern, wherein the RPM is in turn used to track the segments 32, 34 as they move around the rotational weather pattern. The transmitted electromagnetic radiation generally increases the temperature and/or decreases the relative humidity of the segments 32, 34. The transmitted electromagnetic energy would generally be applied across the top layer of the vertical storm mass, with additional deeper penetration as the top layer begins to dissipate. Accordingly, the transmitted electromagnetic energy interrupts the cycle of vertical upward and downward movement of air, water, and water vapor, and destabilizes the developing rotational motion of the tropical depression, causing it to break up and dissipate. Thus, the rotational weather pattern may be prevented from ultimately developing into a hurricane.

As will be discussed in greater detail, when not focusing the transmitted electromagnetic energy on a tropical depression, the energy may alternatively be used to create Earth-based solar energy. Such an approach may help alleviate costs of operating the system solely for hurricane prevention. Periods when the technology is not being used for hurricane prevention include those periods between formation of tropical depressions, and those months (e.g., December through May in the Northern Hemisphere) outside of hurricane season. Also, during those intermission periods between tropical depressions and also from December through May in the Northern Hemisphere, the energy may alternatively be used (in a manner similar to disrupting tropical depressions) to disrupt large thunderstorm masses over the U.S. when they begin to rotate and create conditions likely to spawn tornados, thus interrupting the rotational cycle and diminishing the probability of spawning tornados.

Figure 3:
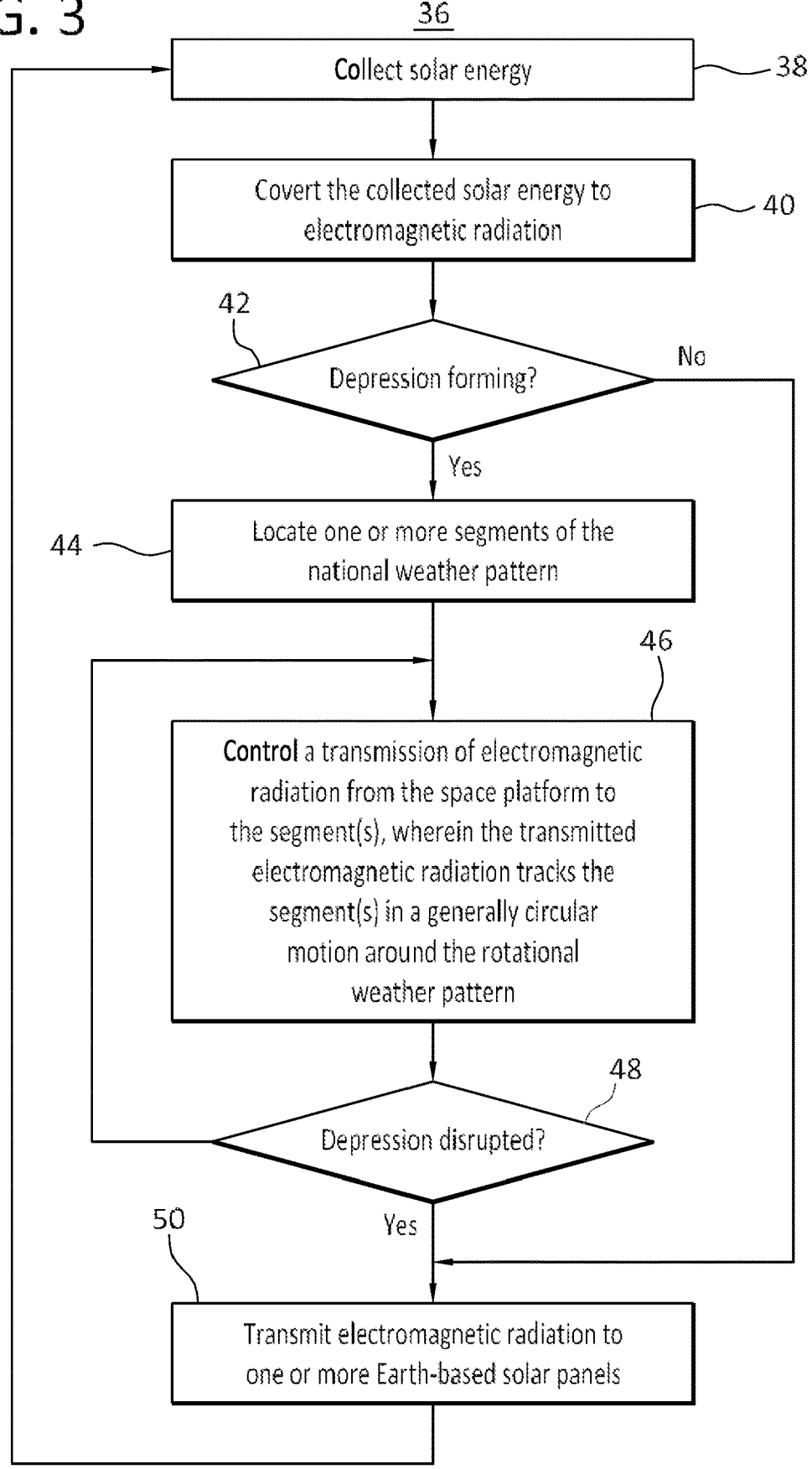
FIG. 3 is a flowchart of an example of a method of operating a space platform according to an embodiment.

FIG. 3 shows a method 36 of operating a space platform. The method 36 may generally be implemented in a space platform such as, for example, the first space platform 10 (FIG. 1) and/or the second space platform 20 (FIG. 1), already discussed. More particularly, the method 36 may be implemented in one or more modules as a set of logic instructions stored in a machine- or computer-readable storage medium such as RAM, ROM, programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 36 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, pCode, state-setting data, configuration data for integrated circuitry, state information that personalizes electronic circuitry and/or other structural components that are native to hardware (e.g., host processor, central processing unit/CPU, microcontroller, etc.).

Illustrated processing block 38 provides for collecting solar energy, wherein the collected solar energy is converted into electromagnetic radiation (e.g., microwave energy, millimeter wave energy, solar energy, laser energy and/or other type of energy) at block 40. A determination may be made at block 42 as to whether a tropical depression or other rotational weather pattern is forming. Block 42 may include accessing satellite tracking data via a weather service, announcements, and so forth. In one example, the tropical depression becomes of interest when it starts to organize into a somewhat circular, slowly rotating mass. If it is determined at block 42 that a tropical depression is forming, illustrated block 44 locates and/or selects one or more segments of the rotational weather pattern. The segment(s) may be similar to the segments 32, 34 (FIGS. 2A and 2B), already discussed.

Transmission of the electromagnetic radiation from the space platform to the one or more segments is controlled at block 46, wherein the transmitted electromagnetic radiation tracks the one or more segments in a generally circular motion around the tropical depression (e.g., rotational weather pattern). In an embodiment, block 46 includes conducting beam steering. In one example, a determination is made at block 48 as to whether the tropical depression has been disrupted. If not, the illustrated method 36 returns to block 46. Once the tropical depression is disrupted, the electromagnetic radiation may be transmitted at block 50 to one or more Earth-based solar panel arrays and the illustrated method 36 returns to block 38. If it is determined at block 42 that a depression is not forming, blocks 44, 46 and 48 may be bypassed. The illustrated method 36 therefore reduces the likelihood of damage, injury and/or loss of life associated with hurricanes.

Figure 4:
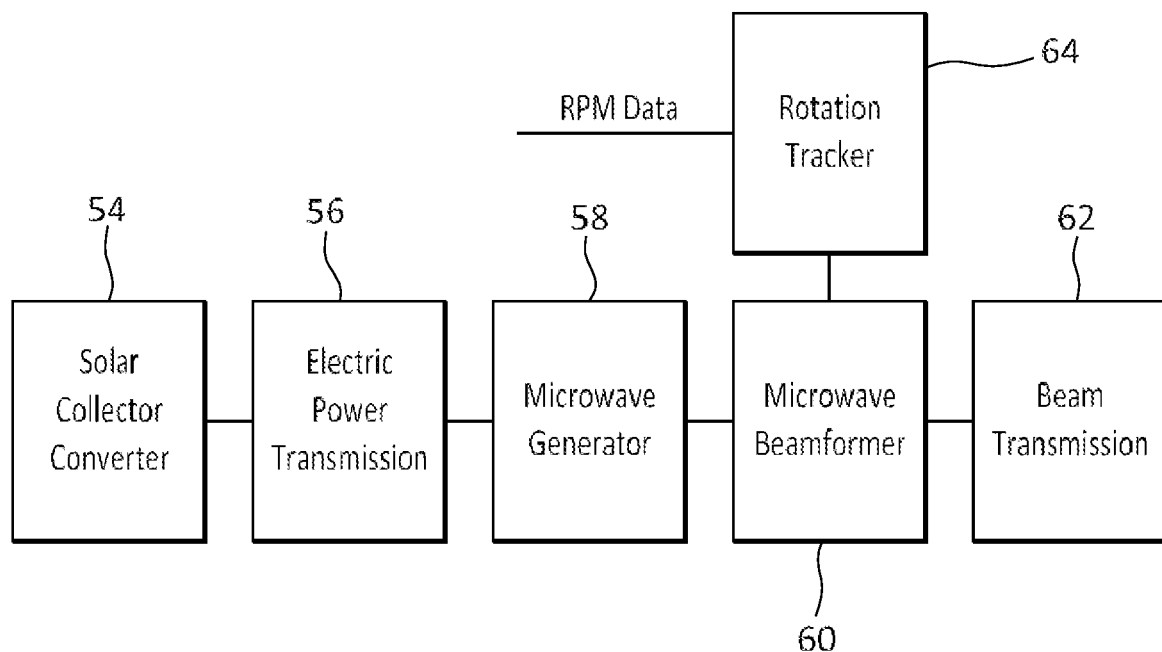
FIG. 4 is a block diagram of an example of a logic architecture according to an embodiment.

FIG. 4 shows a logic architecture 52 that may be include in a space platform subsystem such as, for example, the subsystem 14 (FIG. 1) and/or the subsystem 24 (FIG. 1), already discussed. Moreover, the logic architecture 52, which may include logic instructions, configurable logic, fixed-functionality hardware logic, etc., or any combination thereof, may implement one or more aspects of the method 36 (FIG. 3), already discussed. A solar energy collector and converter 54 may be capable of converting radiant energy received from the sun to electrical energy. In one example, the solar energy collector and converter 54 includes photovoltaic, thermoelectric and/or thermionic devices. If photovoltaic devices are used, a plurality of solar photovoltaic conversion devices may be affixed to the surface of a disc directed toward the sun. A number of such photovoltaic conversion devices include, but are not limited to, cadmium sulfide cells, N/P silicon cells, webbed dendrite silicon or silicon ribbon single crystals in appropriate form, silicon solar cells or layers of monolithic, integrally connected film cells, gallium arsenide solar cells, and organic film solar cells.

In one example, the photovoltaic collection device is in the form of large thin areas, of low cost and good stability and high efficiency. Thus, although single PN-junction single transition silicon solar cells having theoretical efficiencies of twenty to twenty-five percent may be used, a multicellular device may be constructed consisting of two or more photovoltaic layers in a sandwich configuration, which may have an efficiency up to about forty percent. The photovoltaic conversion cells may also be formed of organic compounds that have semiconductor characteristics.

In a similar manner, thermoelectric converters such as bimetallic junctions that undergo the Seebeck effect to convert heat into electrical energy and thermionic devices such as high vacuum and plasma diodes may be used in the collector and converter 54 in place of or in conjunction with photovoltaic converters.

In one example, the cells are protected with conductive ultraviolet absorbing layers to protect the photoconductive film and to convert the ultraviolet radiation to usable near-ultraviolet or visible light. Optical concentrators may also be incorporated into the solar energy collector and converter 54 to focus the solar radiation on the cells.

Inasmuch as the solar energy collector and converter 54 is continually oriented to face the sun, means may be provided to guide the solar energy collector and converter 54 and to control its orientation. Guidance means include, but are not limited to, sun sensors, star trackers, horizon seekers, and so forth. Control and actual orientation of the solar energy collector and converter 54 may be achieved by three orthogonally-oriented electrically powered reaction wheels (plus one skewed reaction wheel as a back-up) so as to achieve orientation via renewable energy means without need to use up expendables, and possibly augmented by a gravity gradient boom, with backup as may be needed from gas fired rockets or ion reaction engines run on a gas such as nitrogen applied from a cryogenic liquid supply.

In one example, each of the photovoltaic cells is then connected by an electric power transmission device 56 (e.g., superconducting cables) to a microwave generator 58. The solar energy collector and converter 54 may be divided into interconnected sectors in order to provide large amounts of power to efficient generators for producing large amounts of microwave energy.

The transmission line of the transmission device 56 may be articulated to provide relative movement between the solar energy collector and converter 54 and the microwave energy generator 58. This requirement may arise because the solar energy collector and converter 54 is continually oriented to face the sun while the microwave energy generator 58 and associated microwave beamformer 60 remain accurately pointed at the rotational weather pattern on the earth. Articulated connections may include rotary joints, slip ring assemblies, etc.

The purpose of the microwave energy generator 58 may be to convert the DC (direct current) electric power developed in the solar energy collector and converter 54 to electrical energy at microwave or millimeter frequencies so that it may be formed into a suitably shaped electromagnetic beam for transmission to Earth. In one example, the wavelength of the microwave electromagnetic radiation formed for transmission to Earth is between about 3 and 30 cm.

In one example, the microwave energy generator 58 operates at high power levels on continuous-wave oscillations at a single frequency. Many such generators include, but not limited to, klystrons, traveling-wave tubes, solid state traveling-wave tubes, backward-wave oscillators and amplifiers, twystrons, and crossed-field devices, which include resonant types such as magnetrons, nonresonant backward and forward wave types such as amplitrons, carcinatrons and dematrons.

To accommodate the power desired, multiple instances of the microwave generator 58 may operate in phase synchronization with each other. This may be accomplished by the use of an appropriately chosen, controlled phase shifting network employing known phase shifters such as those incorporating ferrites, switched diodes, variable-length line design techniques, and the like. A properly programmed computer may be used in conjunction with the phase shifting mechanism.

An antenna network may form a part of the microwave beamformer 60 and a beam transmitter 62. In one example, the antenna network includes oscillators, amplifiers, phase shifters, etc. The microwave antenna network may be capable of accurately directing (e.g., via beam steering) the microwave beams of electromagnetic energy to the tropical depression on the earth. In one example, the radiation power pattern of the microwave beam is formed into an appropriate configuration with respect to the main beam shape and width and to sidelobe energy distributions. These beam requirements may be met by generating the proper amplitude and phase source distributions over the antenna aperture, and by the use of a rotation tracker 64. In one example, the rotation tracker 64 uses RPM data to determine where to aim the transmitted electromagnetic radiation. In another example, the rotation tracker 64 receives wind velocity data and calculates/determines the RPM.

In one example, the determination/calculation of RPMs is straightforward as follows: For approximate calculation purposes, assume that the tropical depression is circular. The wind speed in miles per hour (mph) is equivalent to one 360 degree rotation of a point on the circumference in 1 hour. There are 60 minutes in one hour, so one revolution per hour is 60 rpm (revolutions per minute). The circumference of a circle is 2*Pi*r, or Pi*d. Thus, the rpm of the tropical depression is wind speed in mph divided by 60 times Pi times the diameter of the tropical depression, where Pi=3.14. As an example, if the wind speed is 25 mph and the diameter of the tropical depression is 20 miles, then rpm=26 rpm (for reference, the rpm of a 33⅓ vinyl record is 33⅓ rpm).

Figure 5:
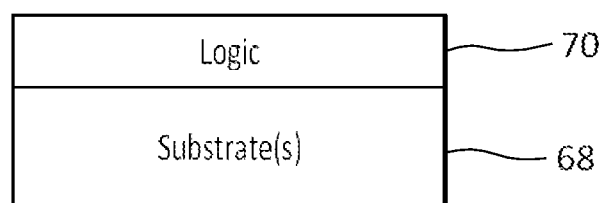
FIG. 5 is an illustration of an example of a semiconductor apparatus according to an embodiment.

FIG. 5 shows a semiconductor apparatus 66. The illustrated apparatus 66 includes one or more substrates 68 (e.g., silicon, sapphire, gallium arsenide) and logic 70 (e.g., transistor array and other integrated circuit/IC components) coupled to the substrate(s) 68. The logic 70 may be implemented at least partly in configurable logic or fixed-functionality hardware logic. In one example, the logic 70 generally implements one or more aspects of the method 36 (FIG. 3), already discussed. Accordingly, the logic 70 may locate one or more segments of a rotational weather pattern and transmit electromagnetic radiation from a space platform to the one or more segments, wherein the transmitted electromagnetic radiation tracks the one or more segments in a generally circular motion around the rotational weather pattern. In one example, the transmitted electromagnetic radiation increases the temperature of the one or more segments. The transmitted electromagnetic radiation may also decrease the relative humidity of the one or more segments.

The logic 70 may also coordinate the transmission of the electromagnetic radiation with one or more additional space platforms. In an example, the space platform includes one or more solar panel arrays to collect solar energy and the logic 70 includes a converter to convert the solar energy to the transmitted electromagnetic radiation. In such a case, the transmitted electromagnetic radiation includes microwave energy and/or millimeter wave energy. Depending on the size and strength of the tropical depression, it may not be necessary to apply all of the available energy in every case. A command and control center with a man-in-the-loop (operated by the government or by a commercially licensed entity) would be authorized to make final decisions as to when to start and stop the energizing of a tropical depression (most if not all of the activity would be over international waters).

The cost of launches has begun to significantly decrease in the last few years (and is projected to continue to significantly decrease, in some cases by orders of magnitude) due to the advent of commercial launch vehicle industry (including reusable launch vehicles), making the projected launch cost much more affordable and feasible than it was just a few years ago. All prior studies on space solar power systems, including by various US government entities as recently as April 2015, have concluded that projected launch costs at did not lead to a viable business or government model in providing commercial power. The accelerating reduction in launch costs is likely to significantly alter these conclusions and result in viable business models. Moreover, the solution described herein is a different sort of trade-off, including political considerations, with hurricane damage, destruction, suffering, and deaths traded off against cost.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A space platform comprising:
   logic to locate one or more masses of an ocean-based weather system, as the ocean-based weather system starts to organize and before the ocean-based weather system spawns a land-based storm; and
   a transmitter to transmit electromagnetic radiation from the space platform to the one or more masses, wherein the transmitted electromagnetic radiation is to track the one or more masses as the ocean-based weather system is starting to organize and rotate, and wherein the transmitted electromagnetic radiation is to prevent the ocean-based weather system from rotating and spawning the land-based storm.

2. The space platform of claim 1, wherein the transmitted electromagnetic radiation is to increase a temperature of the one or more masses.

3. The space platform of claim 1, wherein the transmitted electromagnetic radiation is to decrease a relative humidity of the one or more masses.

4. The space platform of claim 1, wherein the logic is to coordinate transmission of the electromagnetic radiation with one or more additional space platforms.

5. The space platform of claim 1, further including:
   one or more solar panel arrays to collect solar energy; and
   a converter to convert the collected solar energy to the transmitted electromagnetic radiation, wherein the transmitted electromagnetic radiation includes millimeter wave energy.

6. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates is to:
   locate one or more masses of an ocean-based weather system, as the ocean-based weather system starts to organize and before the ocean-based weather system spawns a land-based storm, and
   control a transmission of electromagnetic radiation from a space platform to the one or more masses, wherein the transmitted electromagnetic radiation is to track the one or more masses as the ocean-based weather system is starting to organize and rotate, and wherein the transmitted electromagnetic radiation is to prevent the ocean-based weather system from rotating and spawning the land-based storm.

7. The semiconductor apparatus of claim 6, wherein the transmitted electromagnetic radiation is to increase a temperature of the one or more masses.

8. The semiconductor apparatus of claim 6, wherein the transmitted electromagnetic energy is to decrease a relative humidity of the one or more masses.

9. The semiconductor apparatus of claim 6, wherein the logic coupled to the one or more substrates is to coordinate transmission of the electromagnetic radiation with one or more additional space platforms.

10. At least one computer readable storage medium comprising a set of instructions, which when executed by a space platform, cause the space platform to:
    locate one or more masses of an ocean-based weather system, as the ocean-based weather system starts to organize and before the ocean-based weather system spawns a land-based storm; and
    control a transmission of electromagnetic radiation from the space platform to the one or more masses, wherein the transmitted electromagnetic radiation is to track the one or more one or more masses as the ocean-based weather system is starting to organize and rotate, and wherein the transmitted electromagnetic radiation is to prevent the ocean-based weather system from rotating and spawning the land-based storm.

11. The at least one computer readable storage medium of claim 10, wherein the transmitted electromagnetic radiation is to increase a temperature of the one or more masses.

12. The at least one computer readable storage medium of claim 10, wherein the transmitted electromagnetic energy is to decrease a relative humidity of the one or more masses.

13. The at least one computer readable storage medium of claim 10, wherein the instructions, when executed, cause the space platform to coordinate transmission of the electromagnetic radiation with one or more additional space platforms.

14. A method comprising:
locating one or more masses of an ocean-based weather system, as the ocean-based weather system starts to organize and before the ocean-based weather system spawns a land-based storm; and
controlling a transmission of electromagnetic radiation from a space platform to the one or more masses, wherein the transmitted electromagnetic radiation tracks the one or more masses as the ocean-based weather system is starting to organize and rotate, and wherein the transmitted electromagnetic radiation prevents the ocean-based weather system from rotating and spawning the land-based storm.

15. The method of claim 14, wherein the transmitted electromagnetic radiation increases a temperature of the one or more masses.

16. The method of claim 14, wherein the transmitted electromagnetic radiation decreases a relative humidity of the one or more masses.

17. The method of claim 14, further including coordinating transmission of the electromagnetic radiation with one or more additional space platforms.

18. The method of claim 14, further including:
collecting solar energy; and
converting the collected solar energy to the transmitted electromagnetic radiation.

19. The method of claim 18, wherein the transmitted electromagnetic radiation includes millimeter wave energy.

* * * * *